(12) United States Patent
Bahl

(10) Patent No.: US 6,618,363 B1
(45) Date of Patent: Sep. 9, 2003

(54) METHOD FOR ADAPTING VIDEO PACKET GENERATION AND TRANSMISSION RATES TO AVAILABLE RESOURCES IN A COMMUNICATIONS NETWORK

(75) Inventor: Paramvir Bahl, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/169,122

(22) Filed: Oct. 9, 1998

(51) Int. Cl.[7] .............................. H04Q 7/00; H04Q 7/20
(52) U.S. Cl. ....................... 370/329; 370/347; 370/366; 370/369; 370/375; 348/385.1; 348/390.1
(58) Field of Search ................................ 370/337, 314, 370/328, 329, 345, 347, 360, 366, 369, 375, 378, 379; 348/384.1, 385.1, 387.1, 390.1

(56) References Cited

U.S. PATENT DOCUMENTS

| | | |
|---|---|---|
| 4,751,742 A | 6/1988 | Meeker |
| 4,797,742 A | 1/1989 | Sugiyama et al. |
| 4,821,119 A | 4/1989 | Gharavi |
| 5,001,561 A | 3/1991 | Haskell et al. |
| 5,109,528 A | 4/1992 | Uddenfeldt |
| 5,115,309 A | 5/1992 | Hang |
| 5,214,789 A | 5/1993 | George |
| 5,216,503 A | 6/1993 | Paik et al. |
| 5,315,670 A | 5/1994 | Shapiro |
| 5,412,741 A | 5/1995 | Shapiro |
| 5,436,665 A | 7/1995 | Ueno et al. |
| 5,455,629 A | 10/1995 | Sun et al. |
| 5,513,379 A | 4/1996 | Benveniste et al. |
| 5,526,052 A | 6/1996 | Ar |
| 5,543,845 A | 8/1996 | Asamura et al. |
| 5,572,221 A | 11/1996 | Marlevi et al. |
| 5,621,467 A | 4/1997 | Chien et al. |

(List continued on next page.)

OTHER PUBLICATIONS

Shen et al., "Compressed Image Error Concealment and Post–Processing for Digital Video Recording", IEEE Asia–Pacific Conf. On Circuits and Systems, pp. 636–641, Dec. 1994.

Ghanbari et al., "Cell–Loss Concealment in ATM Video Codes", IEEE Transactions on Circuits and Systems for Video Technology, vol. 3, No. 3, Jun. 1993, pp. 238–247.

Zhang et al., "Variable Bit–Rate Video Transmission in the Boradband ISDN Environment", Proceedings of the IEEE, vol. 79, No. 2, Feb. 1991, p. 214–222.

Khansari et al., "Low Bit–Rate Video Transmission Over Fading Channels for Wireless Microcellular Systems", IEEE Trans. on Circuits and Systems for Video Tech., vol. 6, No. 1, Feb. 1996, pp. 1–11.

Podolsky et al., Limited Retransmission of Real–Time Layered Multimedia Signal Processing, pp. 591–596, Dec. 1998.

(List continued on next page.)

*Primary Examiner*—Alpus H. Hsu
*Assistant Examiner*—Roberta Stevens
(74) *Attorney, Agent, or Firm*—Leydig, Voit & Mayer, Ltd.

(57) ABSTRACT

A full service channel access protocol that supports the integrated transport of voice, video and data communications is provided by dividing a communication channel into a plurality of frames, dividing each of the frames into a plurality of slots, and dividing some of the plurality of slots into a plurality of mini-slots. The mini-slots are provided for use by the multiple communication sources to request the establishment of a new voice, data, or video transmission connection over the communication channel. Additionally, a second one of the plurality of slots is divided into a plurality of second mini-slots for use by the multiple communication sources to request the establishment of a new voice, data, or video transmission connection over the communication channel and for use by the multiple communication sources to augment an existing video connection over the communication channel. The method enables timely and power efficient communications over communication network

4 Claims, 10 Drawing Sheets

U.S. PATENT DOCUMENTS

| | | | |
|---|---|---|---|
| 5,625,713 A | | 4/1997 | Allen et al. |
| 5,625,759 A | * | 4/1997 | Freeman ..................... 358/1.15 |
| 5,629,780 A | | 5/1997 | Watson |
| 5,675,384 A | | 10/1997 | Ramamurthy et al. |
| 5,764,805 A | | 6/1998 | Martucci et al. |
| 5,812,547 A | | 9/1998 | Benzimra et al. |
| RE35,916 E | | 10/1998 | Dennison et al. |
| 5,825,759 A | | 10/1998 | Liu |
| 5,877,812 A | | 3/1999 | Krause et al. |
| 5,880,728 A | * | 3/1999 | Yamaashi et al. ........... 345/343 |
| 5,886,995 A | * | 3/1999 | Arsenault et al. ........... 370/477 |
| 5,896,176 A | | 4/1999 | Das et al. |
| 5,926,476 A | | 7/1999 | Ghaibeh |
| 5,936,674 A | | 8/1999 | Kim |
| 5,943,347 A | | 8/1999 | Shepard |
| 5,953,344 A | | 9/1999 | Dail et al. |
| 5,995,668 A | | 11/1999 | Corset et al. |
| 6,002,802 A | | 12/1999 | Chujoh et al. |
| 6,011,587 A | | 1/2000 | Sakazawa et al. |
| 6,035,073 A | | 3/2000 | Kaup |
| 6,052,598 A | | 4/2000 | Rudrapatna et al. |
| 6,055,339 A | | 4/2000 | Wilkinson |
| 6,078,616 A | | 6/2000 | Ozcelik et al. |
| 6,084,911 A | * | 7/2000 | Ishikawa .................... 375/240 |
| 6,111,916 A | | 8/2000 | Talluri et al. |
| 6,125,278 A | | 9/2000 | Wieczorek et al. |
| 6,141,453 A | | 10/2000 | Banham et al. |
| 6,141,486 A | | 10/2000 | Lane et al. |
| 6,167,084 A | | 12/2000 | Wang et al. |
| 6,188,905 B1 | | 2/2001 | Rudrapatma et al. |

OTHER PUBLICATIONS

Molloy et al., "A Video Codec Chipset for Wireless Multimedia Networking", IEEE Sign. Proc. Society Workshop on VLSI Signal Processing, pp. 381–390, Sep. 16–18, 1995.

McCanne et al., "Joint Source/Channel Coding Multicast Packet Video", Proc. International Conf. On Image Processing, vol. 1, pp. 25–28, Oct. 23–26, 1995.

Sanneck et al., "A New Technique for Audio Packet Loss Concealment", Global Telemcommunications Conference, GLOBECOM '96, pp. 48–52, May 1996.

Mallat, S., "Wavelets for Vision", Proceedings of the IEEE, vol. 84, No. 4, Apr. 1996.

Bahl, P., "Supporting Digital Video in a Managed Wireless Network", IEEE Communications Magazine, vol. 36, Issue 6, pp. 94–102, Jun. 1998.

Bahl et al., "Optimizing Resource Utilization in a Wireless Multimedia Network", IEEE Inter. Conf. On Communications, ICC '97, vol. 3, pp. 1432–1437, Jun. 8–12, 1997.

Bahl et al., "H.263 based Video Code for Real–time Visual Communications Over Wireless Radio Networks", IEEE 6th Int. Conf. On Universal Personal Comm., vol. 2, pp. 773–779, Oct. 12–16, 1997.

Ramchandran et al., "Wavelets, Subband Coding, and Best Bases", Proceedings of the IEEE, vol. 84, No. 4, pp. 541–560, Apr. 1996.

* cited by examiner

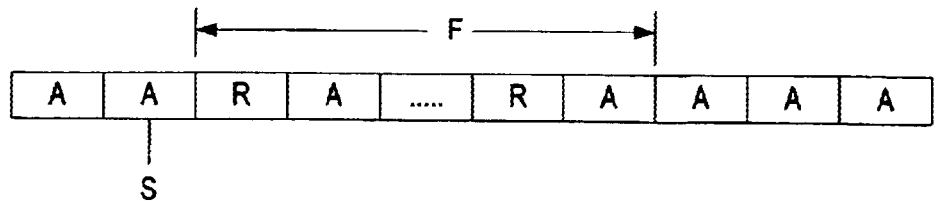
PRMA protocol scheme
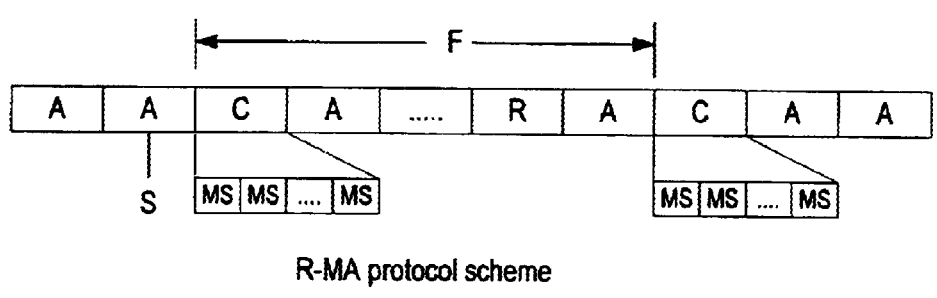
R-MA protocol scheme
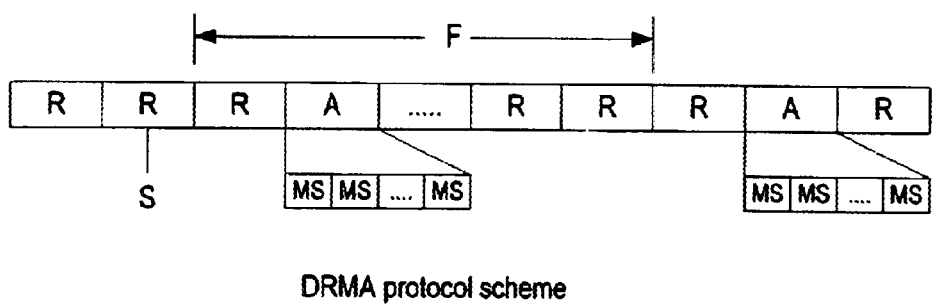
DRMA protocol scheme
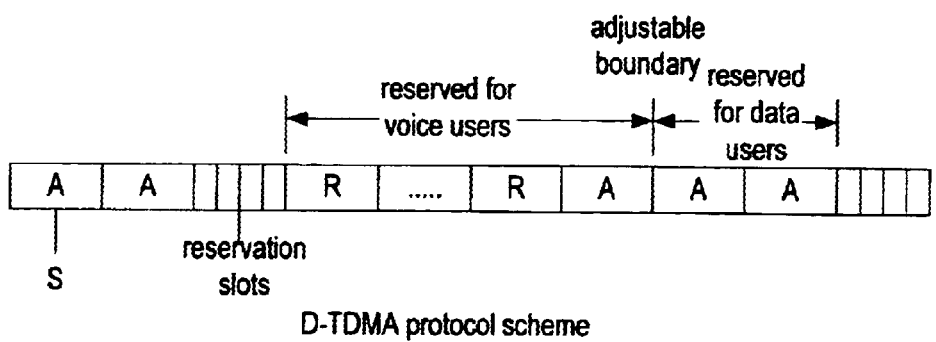
D-TDMA protocol scheme
PRIOR ART FIG. 1

METHOD FOR ADAPTING VIDEO PACKET GENERATION AND TRANSMISSION RATES TO AVAILABLE RESOURCES IN A COMMUNICATIONS NETWORK

FIELD OF THE INVENTION

This invention relates generally to communication networks and, more particularly, relates to a method of adapting video packet generation and transmission rates to available resources in a communications network.

BACKGROUND OF THE INVENTION

In communication networks, the communication channel is a precious resource that needs to be shared intelligently between multiple communication sources. To efficiently utilize this resource, an appropriate channel access scheme must be selected. The target application and the corresponding underlying traffic that is envisioned to traverse the communication network largely influence this selection. Typically, the underlying traffic is envisioned to be integrated packet voice and data communications. Accordingly, currently utilized channel access schemes are biased towards supporting integrated packet voice and data communications while packet video communication is generally ignored.

For supporting integrated packet voice and data communications, several multiple access schemes have been proposed in the prior art. Specifically, these schemes can be organized into three well known categories, namely, Frequency Division Multiple Access (FDMA), Time Division Multiple Access (TDMA), and Code Division Multiple Access (CDMA). Among these three schemes, schemes based on TDMA, where time is divided into frames and frames are divided into slots, have enjoyed the most acceptances.

Generally, in TDMA schemes, a communication source transmits a transmission packet over the communication channel upon the commencement of its assigned time slot. A network router, in the form of a base station, server, or the like, receives the transmission packet and then assists in routing the transmission packet towards its final destination. Depending on which time-slots are assigned to the communication source, TDMA schemes are classified into two types: basic TDMA and dynamic TDMA. In basic TDMA, specific time-slots are assigned to the communication source for the entire duration of the connection. In contrast, in dynamic TDMA, the specific time-slots assigned to the communication source can vary during the lifetime of the connection. Dynamic TDMA schemes are essentially a compromise between random access and controlled access type protocols. These schemes contain at least one contention phase in which new communication sources attempt to announce their presence by transmitting connection establishment request messages to the network router. Examples of such TDMA based schemes include Packet Reservation Multiple Access (PRMA), Reservation-ALOHA and Reservation-MA (R-MA), Dynamic Reservation Multiple Access (DRMA), and Dynamic-Time Division Multiple Access (D-TDMA). The frame structures used in PRMA, R-MA, DRMA, and D-TDMA are each illustrated in prior art FIG. 1.

Turning first to the frame structure utilized with PRMA, a slot S within a frame F is either available A or reserved R. Both voice and data communication sources contend for the available slots according to the voice and data transmission probabilities that are set during the system design. If a voice communication source succeeds during the contention phase, an available slot is assigned to that communication source and is labeled as reserved. The reserved slot is thus made available to that communication source in subsequent frames during the time it is actively generating and transmitting voice packets. When the voice communication source has no more voice packets to transmit, it looses its reservation and goes back to the contention phase when it has additional voice packets to transmit. For the case of pure data communications, if a data communication source succeeds during the contention phase, it uses the available slot to transmit the data packet. However, this slot is not reserved in subsequent frames and remains available to be contended for in the immediately following frames.

Like PRMA, R-MA allows multiplexing to be performed at the talkspurt level and a voice communication source keeps a slot for as long as it is active while a data communication source must contend for a slot during each frame. However, in contrast to PRMA, R-MA requires that some amount of bandwidth be kept available for use in servicing connection requests. This bandwidth is provided in the form of dedicated contention slots C that are further divided into a plurality of mini-slots MS. Thus, in R-MA, it is on the mini-slot boundaries that connection requests are made in accordance with permission probabilities.

In DRMA, similar to PRMA and unlike R-MA, each available slot can be used for information transmission or for channel reservation and no slots are dedicated for servicing connection requests. Furthermore, similar to R-MA and unlike PRMA, when serving as a contention slot, a slot is divided into a plurality of mini-slots on whose boundary connection requests are made in accordance with permission probabilities. Again, once a slot is reserved for a voice communication source, it can be used by that voice communication source in subsequent frames for as long as there are voice packets to transmit. Data communication sources are assigned slots in only one frame for data packet transmissions.

Finally, in D-TDMA frames are further divided into contention slots, voice slots, and data slots. Voice communication sources are allocated slots from the voice slots and data communication sources are allocated slots from the data slots. A registered voice communication source is assigned a voice slot that is maintained until no further voice packets are transmitted. Data communication sources are again assigned slots in only one frame. Furthermore, like R-MA and DRMA, connection requests are made on mini-slot boundaries.

While these discussed schemes do provide respectable quality for voice and data communications, they nevertheless tend to fall short when evaluated for real-time video communications. For example, the described protocols fail to provide any mechanism for guaranteeing sustained bandwidth, bounded delay, and, accordingly, quality of service guarantees for video communications. Quality of service is an essential ingredient for the success of many real-time video applications and without it, under heavy loads, video tends to exhibit poor and sometimes intolerable quality.

A further disadvantage resides in the fact that the frame length in the described schemes is typically designed to be equal to the packet generation period of the voice encoder. In this manner, since one voice packet will be generated in one frame time, both delay and buffering are bounded for voice transmissions. For video transmissions, this choice of frame length has no meaning since video encoders typically generate packets at rates generally faster than voice encoders do. Accordingly, the one slot per frame guarantee does not function to prevent excessive delays or overflow buffering for video transmissions again resulting in video quality degradation.

Yet another disadvantage resides in the fact that these schemes typically omit video communication sources as a separately identifiable communication source when assigning slots on a priority basis. Accordingly, when video packets are treated as voice packets, the typically higher priority given to voice packets coupled with the high demand for bandwidth required by video transmissions tends to overwhelm the resources of the communication network while degrading all on-going connections. Similarly, when video packets are treated as data packets, the data packet requirement of contending for every slot tends to result in frequent collisions causing excessive delays in video transmissions that again function to lower both the quality of on-going connections and the overall bandwidth utilization of the communication network.

Finally, the described schemes that rely completely on contention to determine slot allocation will perform poorly under heavy load. Accordingly, when video communications are introduced into the communication network, the amount of data in the system is increased to the point where collisions are bound to escalate. This results in excessive delays and packet dropping for on-going video connections. This occurs even in those schemes that reserve a fixed amount of resources for contention purposes such as R-MA and D-TDMA.

From the foregoing, it is seen that a need exists for an improved channel access protocol. In particular, such a protocol is needed for use in establishing a full service network that provides comprehensive support for integrated transport of voice, video and data communications.

SUMMARY OF THE INVENTION

According to this need, the present invention is generally directed to a method for allocating between multiple communication sources a communication channel in a communication network. The method is performed by dividing the communication channel into a plurality of frames, dividing each of the frames into a plurality of slots, and dividing some of the plurality of slots into a plurality of first mini-slots. The mini-slots are provided for use by the multiple communication sources to request the establishment of a new voice, data, or video transmission connection over the communication channel. Additionally, one of the plurality of slots is divided into a plurality of second mini-slots for use by the multiple communication sources to request the establishment of a new voice, data, or video transmission connection over the communication channel and for use by the multiple communication sources to augment an existing video connection over the communication channel. In this manner a dynamic Time Division Multiple Access protocol frame is created that is available to support the integrated transport of voice, video and data communications over the communications network.

The subject invention is also described in P. Bahl, "ARMAP—An Energy Conserving Protocol for Wireless Multimedia Communications," IEEE International Symposium on Personal, Indoor and Mobile Radio Communications, Boston, Mass., (Sep. 8–11, 1998) which is incorporated herein by reference in its entirety.

A better understanding of the objects, advantages, features, properties and relationships of the invention will be obtained from the following detailed description and accompanying drawings which set forth an illustrative embodiment which is indicative of the various ways in which the principles of the invention may be employed.

BRIEF DESCRIPTION OF THE DRAWINGS

For a better understanding of the invention, reference may be had to a preferred embodiment shown in the accompanying drawings in which:

FIG. 1 illustrates the frame structure of selected prior art TDMA schemes;

DETAILED DESCRIPTION OF THE INVENTION

Figure 2:
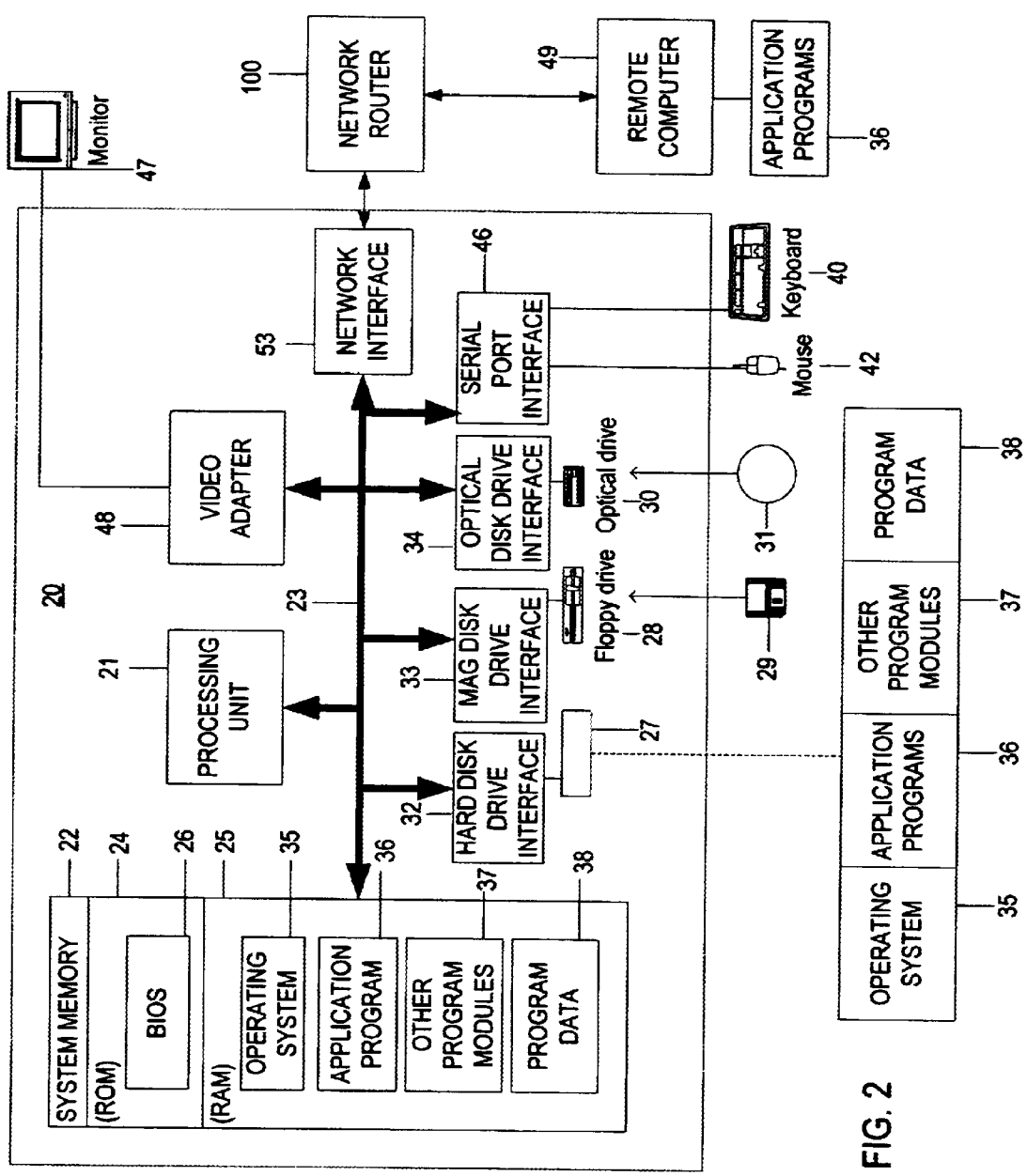
FIG. 2 is a block diagram of the components that are used in connection with the subject invention.

Turning to the drawings, wherein like reference numerals refer to like elements, the invention is illustrated as being implemented in a suitable network environment. Although not required, the invention will be described in the general context of computer-executable instructions, such as program modules, being executed by a processing device such as a personal computer, mainframe computer, or the like. Generally, program modules include routines, programs, objects, components, data structures, etc. that perform particular tasks or implement particular abstract data types. Moreover, those skilled in the art will appreciate that the invention may be practiced with other processing devices such as consumer electronic devices having one or more processors such as, for example, mobile telephones. The invention may also be practiced in distributed computing environments where tasks are performed by remote processing devices that are linked through a communication network and where program modules are located in both local and remote memory storage devices.

With reference to FIG. 2, an exemplary network system in which the invention may reside is illustrated. The network system includes a communication source 20 illustrated in the exemplary form of a personal computer. The communication source 20 includes a processing unit 21, a system memory 22, and a system bus 23. The system bus 23 functions to couple the various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routines that help to transfer information between elements within the communication source 20, such as during start-up, is stored in ROM 24. The communication source 20 may also include a hard disk drive 27, a magnetic disk drive 28, or an optical disk drive 30. It will be appreciated that these devices respectively allow for reading from and writing to a hard disk, reading from or writing to a removable magnetic disk 29 and for reading from or writing to a removable optical disk 31, such as a CD ROM or other optical media.

When incorporated into the communication source 20, the hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the communication source 20. It will be appreciated by those skilled in the art that other types of computer readable media that can store data may also be used. Examples of such media devices include, but are not limited to, magnetic cassettes, flash memory cards, digital videodisks, Bernoulli cartridges, random access memories, and read only memories.

A number of program modules may be stored in one or more of the memory devices and typically include an operating system 35, one or more applications programs 36, other program modules 37, and program data 38. A user may enter commands and information into the communication source 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor 47, the communication source 20 may also include other peripheral output devices, not shown, such as speakers and printers.

The communication source 20 operates in a networked environment using logical connections to one or more remote communication receivers 49, also illustrated in the exemplary form of a personal computer. The connection is typically made through a further processing device 100 that is responsible for network routing. In the illustrated embodiment, the remote communication receiver 49 will include many or all of the elements described above relative to the communication source 20 including the memory storage devices and monitor 47. Furthermore, within such a networked environment, it will be appreciated that program modules depicted relative to the communication source 20, or portions thereof, may be stored in the memory storage devices of the remote communication receiver 49.

The description that follows will refer to acts and symbolic representations of operations that are performed by the processing devices 20,49,100 unless indicated otherwise. As such, it will be understood that such acts and operations, which are at times referred to as being computer-executed, include the manipulation by the CPUs of the devices of electrical signals representing data in a structured form. This manipulation transforms the data or maintains it at locations in the memory system, which reconfigures or otherwise alters the operation of the processing devices 20,49,100 in a manner well understood by those of skill in the art of computer systems. The data structures where data is maintained are physical locations of the memory that have particular properties defined by the format of the data. While the invention is being described in the foregoing context, it is not meant to be limiting as those skilled in the art will further appreciate that various of the acts and operation described herein may also be implemented in hardware.

Figure 3:
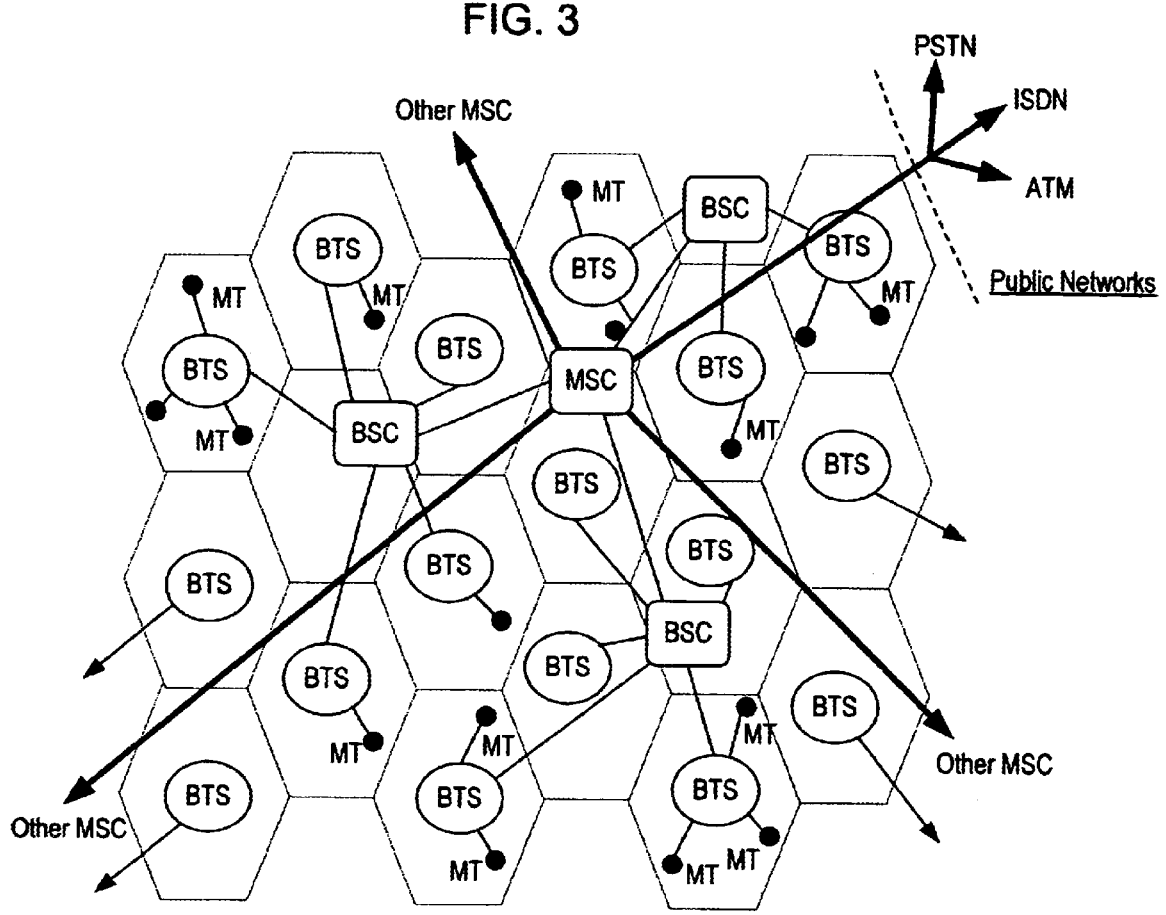
FIG. 3 illustrates the architecture of a cellular communication network in which the components depicted in FIG. 2 may reside.

In a preferred embodiment, the network environment comprises a wireless, cellular communication network such as depicted in FIG. 3. Nevertheless, while the invention will be described hereinafter in that context, those of skill in the art will appreciate how to adapt the features of the subject invention for us in other communication networks such as a local area network (LAN) or a wide area network (WAN). Accordingly, the description that follows is not intended to be limiting.

Figure 4:
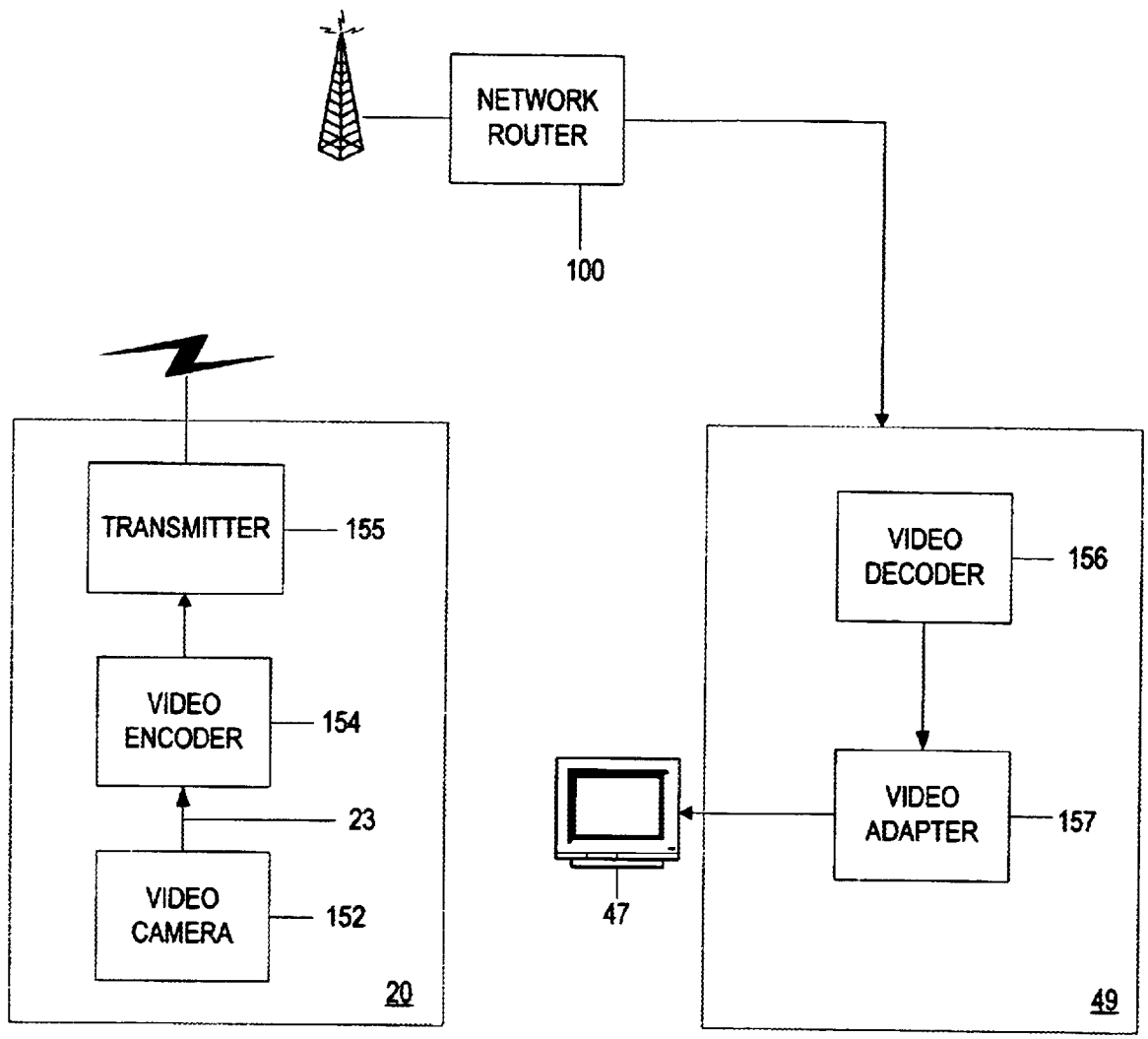
FIG. 4 is a further block diagram of the communication source, communication receiver, and network router depicted in FIG. 2.
Figure 5:
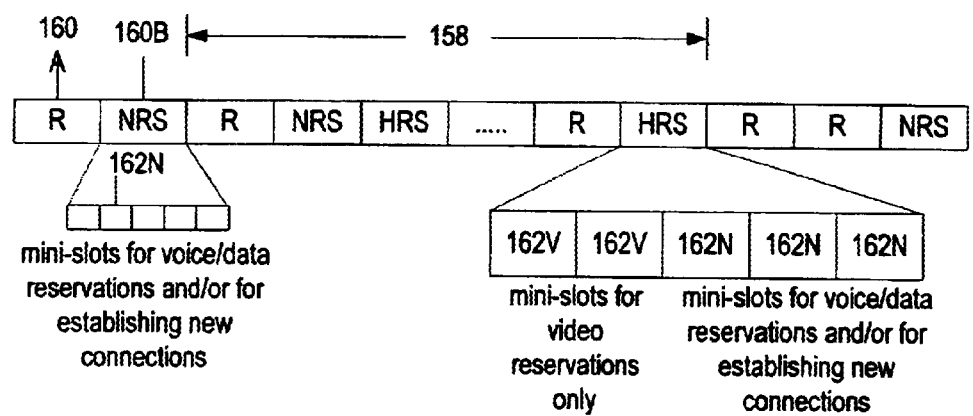
FIG. 5 illustrates the frame structure of the ARMAP scheme that is used in accordance with the subject invention to transmit information between the components depicted in FIGS. 2 and 4.

Turning to FIG. 3, a cellular communication network having architecture that is similar to the architecture that is found in a Global System for Mobility (GSM) network is illustrated. As will be well understood by those of skill in the art, mobile terminals MT communicate over a radio channel with a network router in the form of a base transceiver station BTS that is located within the same cell. The base transceiver stations BTSs of neighboring cells communicate over fiber-based channels with a base station controller BSC that serves as their manager. In turn, the base station controllers BSCs in a geographic region communicate over fiber-based channels with a mobile switching center MSC that serves as their manager. The mobile switching centers MSCs are connected to a public network that may include public switched telephone networks PSTNs, integrated services device networks ISDNs, or asychronous transport mode ATM networks. More specifically, the mobile terminals MT within the network are envisioned to be communication sources 20 of the following types: 1) communication sources 20VO performing voice packet transmissions; 2) communication sources 20DA performing data packet transmissions; and 3) communication sources 20VI performing video packet transmission. Meanwhile, linked to the public network as a destination for the transmissions originating from the mobile terminals MT are remote communication receivers 49 of the following type: 1) remote communication receivers 49VO receiving voice transmissions; 2) remote communication receivers 49DA receiving data transmissions; and 3) remote communication receivers 49VI receiving video transmissions. The communication sources 20VO and 20DA may include voice and data encoders, respectively, of conventional design. However, it is preferred that the communication sources 20VI include a video encoder in the form described in commonly owned, co-pending U.S. patent application Ser. No. 09/169,724, entitled "METHOD AND APPARATUS FOR USE IN TRANSMITTING VIDEO INFORMATION OVER A COMMUNICATION NETWORK," filed on Oct. 9, 1998, that is incorporated herein by reference in its entirety. It is also preferred that the remote communication receivers 49VI be adapted to reconstruct the video information transmitted by the communication sources 20VI in the manner described in said incorporated In accordance with one important aspect of the invention, the communication network provides for the efficient transmission of video communications from the communication sources 20VI to one or more associated remote communication receivers 49VI for subsequent display to remote users. For this purpose, as illustrated in FIG. 4, the communication sources 20VI are each provided with a video camera 152 that functions to capture video images as a series of digital video frames. Within the communication sources 20VI, the video camera 152 is connected to a video encoder 154 via the system bus 23. The video encoder 154 functions to generate information that is representative of the video frame which information is subsequently supplied to a transmitter 155 for broadcasting over the communication channel to the network router 100, e.g., base station BS. Meanwhile, the remote communication receivers 49VI each include a video decoder 156 that functions to recreate the video frame from the information received over the communication network. The decoded video frame may then be forwarded to an associated monitor 47 for viewing through the use of an appropriate video adapter 157. To facilitate the transmission of the information representative of the video frame over the communication channel, the system employs a derivative of the TDMA scheme given the moniker Adaptive Reservation Multiple Access (ARMAP). In ARMAP, the frame structure of which is illustrated in FIG. 5, the communication channel is divided into frames 158 of a given frame time duration and each frame is divided into slots 160 of a given slot time duration. Preferably, the frame time duration is set to be equal to an integer multiple of the voice encoder packet generation period for the voice encoder used within the communication sources 20VO. In this manner, for the case of this integer multiple being one, the arrival of the slot within each frame that has been assigned to a communication source 20VO is synchronized with the voice packet generation period of its voice encoder. This allows exactly one voice packet to be transmitted within each frame 158 for each voice connection. The size of the slots and, accordingly, the number of slots within the frame are preferably arrived at using the available system bandwidth, the voice encoder and the methodology described in the previously incorporated U.S. patent application Ser. No. 09/169,724, entitled "METHOD AND APPARATUS FOR USE IN TRANSMITTING VIDEO INFORMATION OVER A COMMUNICATION NETWORK," filed on Oct. 9, 1998. Accordingly, it will not be described in greater detail herein.

Within ARMAP, the slots 160 within each frame are further categorized as being either reserved slots 160A or reservation slots 160B. Reserved slots 160A are slots that have been assigned to a communication source 20 for use in performing on-going voice or video transmissions over the communication network. Reservation slots 160B are slots in which the network router 100 receives connection request messages issued by a communication source 20 that an unreserved or available slot be assigned to the communication source 20 for use in transmitting voice, data, or video information over the communication network. Preferably, all available slots are used as reservation slots 160B.

The reservation slots 160B within ARMAP are further categorized as being either normal reservation slots NRS or hybrid reservation slots HRS. If no on-going video connections are established within the communication network, all of the reservation slots 160B will be of the normal reservation slot NRS variety. Both normal reservation slots NRS and hybrid reservation slots HRS are further divided into a plurality of mini-slots 162 having a mini-slot time duration.

The mini-slots 162 are utilized by the communication sources 20 to contend for the resources of the communication channel. The mini-slot time duration is preferably established as a function of the number of bits that comprise the various request messages, the slot size and number of connections to be supported by the communication system.

All of the mini-slots 162 within the normal reservation slots NRS are contended for in an uncontrolled manner by the communication sources 20. Meanwhile, only designated mini-slots 162 within the hybrid reservation slots HRS are contended for in an uncontrolled manner by the communication sources 20. Specifically, the mini-slots 162 within the hybrid reservation slots HRS are further partitioned whereby some of the mini-slots 162V are contended for in a controlled manner while the remaining mini-slots 162N are contended for in the usual uncontrolled manner. The reason for this further partitioning within the hybrid reservation slot will be made apparent from the description that follows.

The network router 100 will accept within the mini-slots 162 of the normal reservation slots NRS a connection request message issued by a communication source 20 for the purpose of establishing a new voice, data or video connection. Additionally accepted by the network router 100 within the mini-slots 162 of the normal reservation slots NRS are reservation request messages issued by communication sources 20VO and 20DA for the purpose of supporting an on-going voice or data connection, respectively. The network router 100 will not accept within the mini-slots 162 of the reservation slots NRS a reservation request message issued by a communication source 20VI for the purpose of supporting an on-going video connection.

The network router 100 will accept within the mini-slots 162N of the hybrid reservation slots HRS a connection request message issued by a communication source 20 for the purpose of establishing a new voice, data or video connection. Additionally accepted by the network router 100 within the mini-slots 162N of the hybrid reservation slots HRS are reservation request messages issued by communication sources 20VO and 20DA for the purpose of supporting an on-going voice or data connection, respectively. The network router 100 will not accept within the mini-slots 162N of the hybrid reservation slots HRS a reservation request message issued by a communication source 20VI for the purpose of supporting an on-going video connection. Such reservation request messages are, however, accepted by the network router 100 within the mini-slots 162V of the hybrid reservation slots HRS to the exclusion of any other type of request message.

The network router 100 is responsible for notifying the contending communication sources 20 of the success or failure of their connection request. It is preferred that real-time voice communication connection request messages be afforded the highest priority while non-real time data voice communication connection request messages bear the lowest priority. If a communication source 20 is successful during the contention phase, the network router 100 will initiate a dialog with the communication source 20 and execute the steps necessary to create the connection. As will be appreciated by those of skill in the art, these steps typically include providing the communication source 20 with a connection identifier that is used by the communication source 20 for the purpose of identifying the source and destination addresses for all subsequent packet transmissions. Once this connection has been established, the communication sources 20 are then required to issue reservation request messages before transmissions may commence. Upon the receipt of a reservation request message, the network router 100 will assign slots 160 to the requesting communication source 20 as a function of the type of communications to be issued by the communication source 20.

Slots are assigned to the communication sources 20 either statically or dynamically. Under normal operation, static assignments are maintained for the lifetime of the connection while dynamic assignments are varied, typically as a function of the nature of the reservation request and available bandwidth. Reservations for statically assigned slots are made concurrently with connection establishment requests wherein the connection request message includes a bit pattern signifying to the network router 100 the exact number of slots 160 that the connecting communication source 20 wishes to be assigned. Reservations for dynamically assigned slots are made in reservation requests wherein the reservation request message includes a bit pattern signifying to the network router 100 the exact number of slots 160 that the communication source 20 wishes to be assigned. Successfully reserved slots may be canceled by explicit or implicit disconnect messages. Implicit disconnection is assumed if the connected communication source 20 fails to use the reserved slot 160A it has been assigned for a predetermined period of time, typically one frame. The issuance of an end-of-transmission (EOT) sequence by the connected communication source 20 makes explicit disconnection. In the preferred embodiment, only video connections are allowed to make static reservations. Video connections are also allowed to make dynamic reservations. Data and voice connections are limited to dynamic reservations.

For non-real time data transmissions, a success during the dynamic reservation phase insures that the network router 100 will shortly reserve a slot 160 for use by the communication source 20DA. The communication source 20DA must listen to messages from the network router 100 to determine which slot 160 is being made available as a reserved slot 160A for its use. When the slot 160A becomes available for use by the communication source 20DA, the communication source 20DA transmits its data packet within the slot 160A. For data connections, the single slot 160A is reserved for only one frame. Accordingly, once the frame has expired, the network router 100 makes the slot available to all communication sources 20 on the communication network in the form of a reservation slot 160B. To make any further data transmissions, the communication source 20DA must again contend for the communication channel through the issuance of another reservation request message.

For real-time voice transmission, a success during the dynamic reservation phase insures that the network router 100 will provide one slot 160 in successive frames 158 for use by the communication source 20VO in which the communication source 20VO may transmit its voice packets. Delay restrictions associated with voice packet transmissions further ensure that the network router 100 will only indicate a successful request if it is able to provide a slot 160 no later than one frame measured from the frame in which the request was made. The communication source 20VO must listen to messages from the network router 100 to determine which slot 160 is being made available as a reserved slot 160A for its use. The network router transmits these messages at the start of every time frame in the form of beacon signals. When the slot 160A becomes available for use by the communication source 20VO, the communication source 20VO transmits its voice packet within the slot 160A as it arrives within each frame 158. This reservation is canceled upon the receipt of an EOT by the network router 100 or if the network router 100 fails to receive a voice packet from the communication source 20VO during the reserved slot 160A. Upon cancellation of the slot reservation, the network router 100 makes the slot available to all communication sources 20 in the communication network in the form of a reservation slot 160B. To make any further voice transmissions, the communication source 20VO must again contend for the communication channel through the issuance of another reservation request message.

For real-time video connections, dynamic reservations are more complex but are made without contention. As was described previously, video reservation requests made by a communication source 20VI will only be accepted by the network router 100 during the hybrid reservation slots HRS. Furthermore, for the purpose of avoiding contention, video reservation requests made by the communication source 20VI will only be accepted by the network router 100 during the mini-slot 162V within the hybrid reservation slot HRS that the communication source 20VI has been assigned. The network router 100 makes this acceptance of the video reservation request message to the exclusion of all other types of requests. Specifically, contention is avoided since each communication source 20VI is assigned its own mini-slot 162V. Mini-slots 162N that have not been assigned to a communication source 20VI are open to be contended for by voice reservation requests, data reservation requests, and all connection requests. The network router 100 uses the down link channel to broadcast to the communication sources 20, preferably at the start of each frame, the reservation slots that the network router 100 has categorized as hybrid reservation slots HRS. Additionally the network router 100 uses the down link channel to broadcast the position of the mini-slot 162V within each hybrid reservation slot HRS that has been assigned to each of the communication sources 20VI.

To determine the frequency with which hybrid reservation slots HRS are to be created within the frames, the network router 100 preferably monitors the number of reservation requests issued by the communication sources 20VI which are indicative of their video compression cycles. The video compression cycle is defined as the capture, compression and packetization of a single image-frame within the video sequence. Packetization includes fragmenting the compressed image-frame into fixed size packets, adding the appropriate header bits, and adding error correcting codes to each packet. The reason that the rate at which a communication source 20 VI makes a reservation request is indicative of its video compression cycle results from the fact that reservation requests are typically issued at the end of each video compression cycle. The correlation between the rate of reservation requests and video compression cycles is further enhanced by the fact that there exists an underlying regularity in which video packets are generated for transmission. This regularity is set by the frame capture and compression rate of the video encoder.

In practice, however, due to bandwidth limitations, encoder complexity, and power limitations, the actual video packet generation rate will vary between the different communication sources 20VI. For this reason, each communication source 20VI is preferably monitored individually. A difference in the video compression cycles of the communication sources 20VI may also arise from the fact that some of the communication sources 20VI will include hardware that performs video compression while others rely only on software. Additionally, differences in the processing power of CPUs within the communication sources 20 will also tend to cause the video compression cycles to vary. Finally, differences in the content of the video to be transmitted will affect the speed of the video compression cycles.

The information the network router 100 gathers regarding the video compression cycles of each of the communication sources 20VI may be used to dynamically control the frequency that hybrid reservation slots HRS appear within each frame 158. Additionally, this information may also used to dynamically control the frequency that mini-slots 162V are assigned to the communication sources 20VI within the hybrid reservation slots HRS. In this manner, the network router 100 tailors the communication channel to the requirements of the communication sources 20VI such that timely and optimum usage of the radio resource is achieved.

The adaptive reservation slot generation algorithm utilized within the subject invention is now more specifically described. As illustrated in FIGS. 6A–6E, the network router 100 monitors the normal reservation slots NRS for the purpose of determining if a request message has been issued by one of the communication sources 20. If, as illustrated in FIG. 6B, a communication source 20 has issued a connection request message, the network router 100 evaluates the connection request message to determine the type of transmission connection the communication source 20 wishes to establish. If the connection request is for a video connection, the network router 100 determines if the connection will be allowed and accordingly notifies the requesting communication source 20.

Within the network router 100, the number of communication sources 20VI having video connections is tracked. Additionally, for each of these communication sources 20VI, the number of mini-slots 162V that have been assigned to the corresponding communication source 20VI and their usage is also tracked. Accordingly, when the network router 100 has accepted a new video connection, the network router 100 updates its video connection counter and initializes the corresponding mini-slot 162V usage counter.

Upon the acceptance of a new video connection, the base station also checks to determine if this is the first video connection established within the communication network. If the connection is the first video connection, the network router 100 sets the hybrid reservation slot HRS frequency to its maximum value. This maximum value is preferably pre-established within the network router 100 to be equal to the video packet generation rate of the fastest video encoder that could find its way into the communication network. The network router 100 may, however, dynamically vary this maximum value, for example, as a function of channel traffic. Then, for each new video connection, the network router 100 sets the corresponding mini-slot 162V allocation counter to be equal to the hybrid reservation slot HRS frequency. In this manner, each new video connection is initially allocated one mini-slot 162V within each hybrid reservation slot HRS, i.e. its mini-slot allocation frequency is equal to the hybrid reservation slot HRS frequency.

Figure 6A:
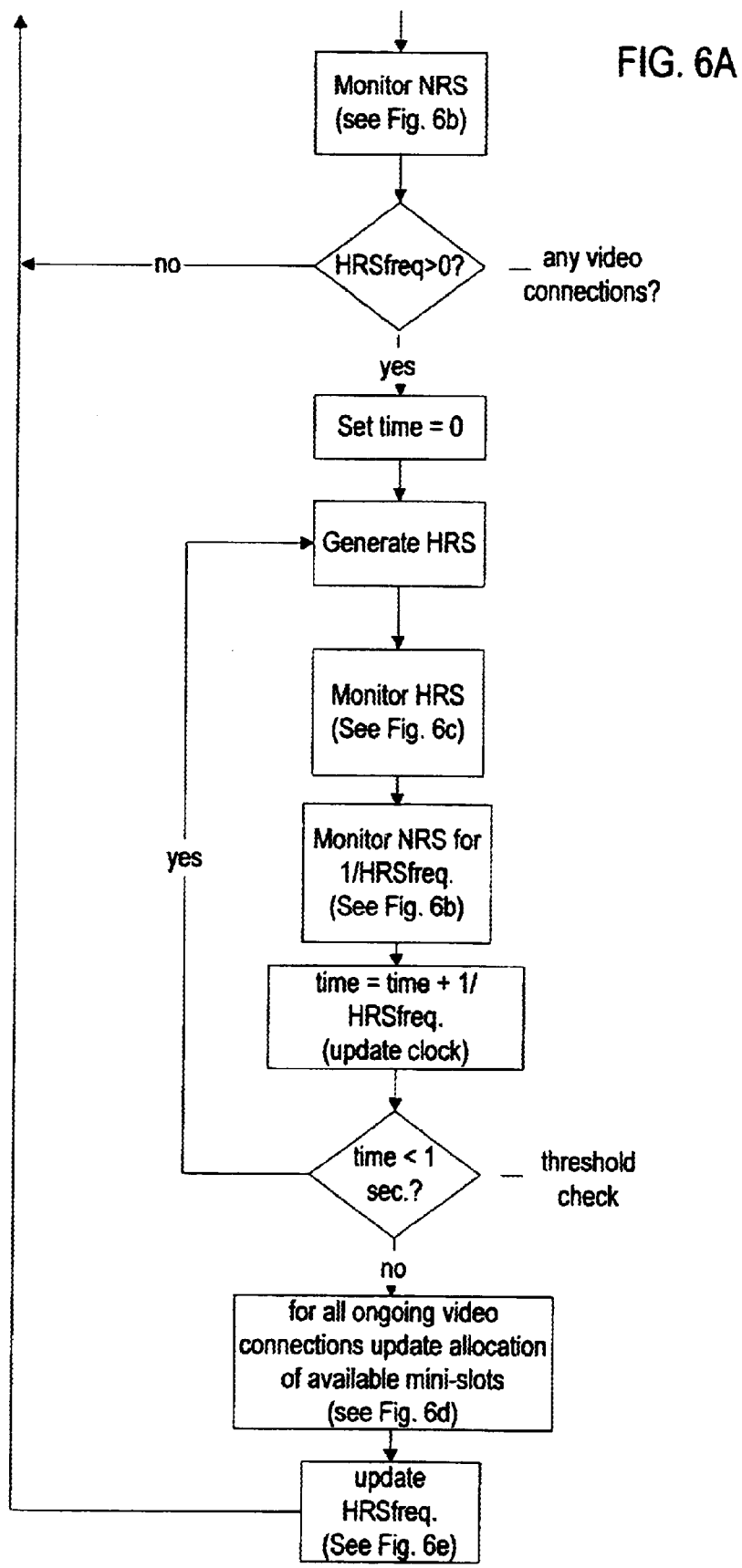
FIG. 6A is a flow chart diagram generally depicting a method for generating the ARMAP frame structure illustrated in FIG. 5.
Figure 6B:
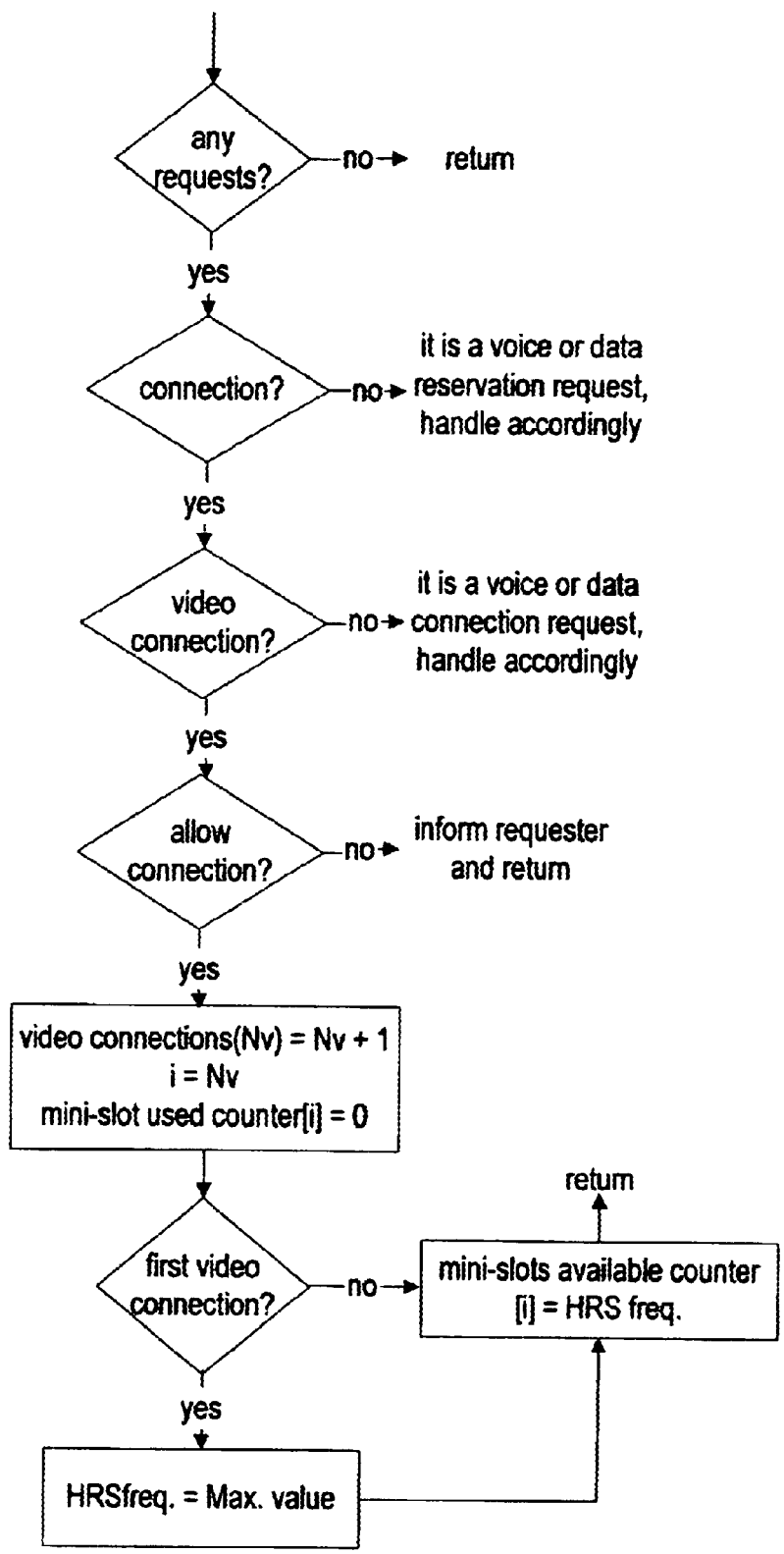
FIG. 6B is a flow chart diagram generally depicting a method for monitoring ARMAP NRS slots in accordance with the method illustrated in FIG. 6A.
Figure 6C:
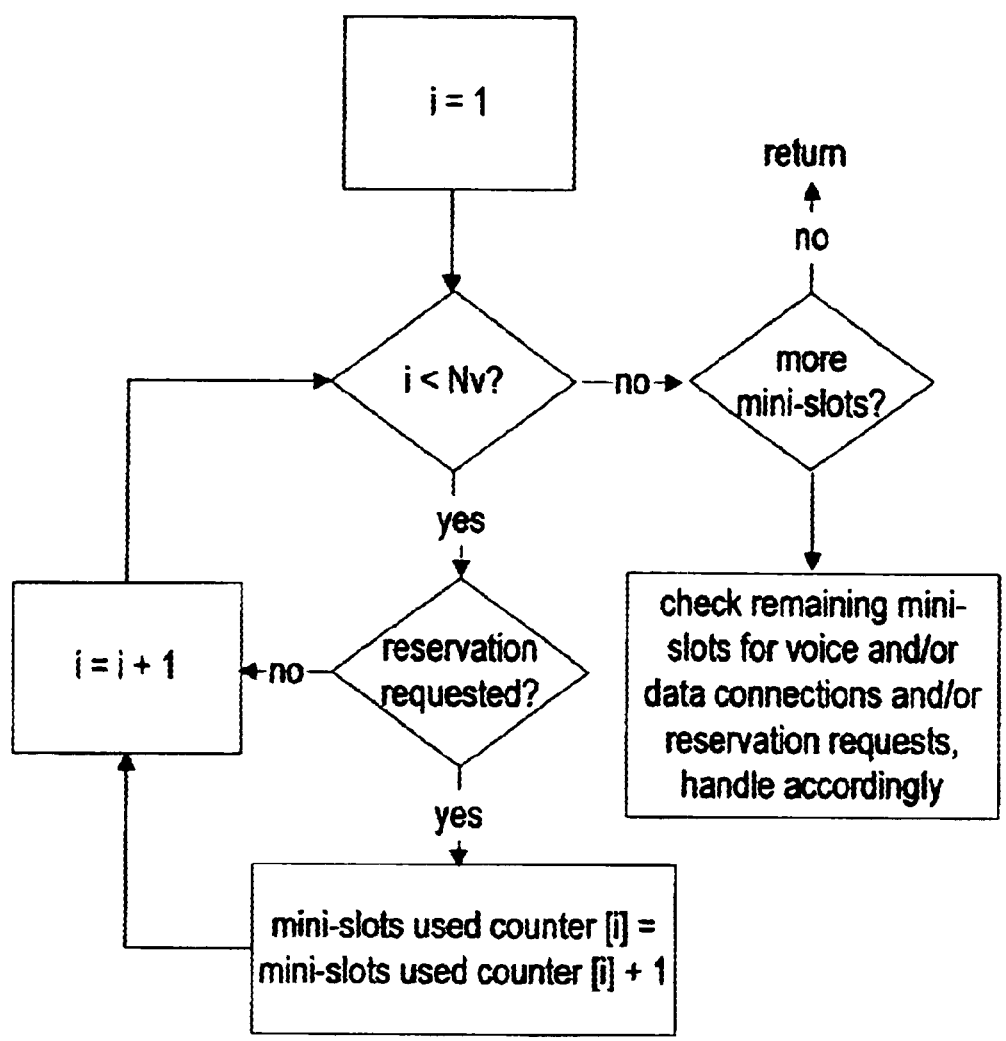
FIG. 6C is a flow chart diagram generally depicting a method for monitoring ARMAP HRS slots in accordance with the method illustrated in FIG. 6A.

Once a video connection has been established within the network, the network router 100 will periodically use, as illustrated in FIG. 6A, the next reservation slot 160B that comes available as a hybrid reservation slot HRS according to the hybrid reservation HRS slot frequency. The network router 100 then monitors this hybrid reservation slot HRS for requests as illustrated in FIG. 6C. When monitoring the hybrid reservation slot HRS, the network router 100 first initializes an internal counter to one and checks the first mini-slot 162V to see if the communication source 20VI that has been assigned this reservation slot 162V has made a reservation request. If a reservation request message has been issued, the corresponding mini-slot usage counter is incremented by one and the request is processed. If no reservation request message has been issued, the internal counter is incremented and then checked against the video connection counter to determine if the previously described process should be repeated. If there are no further mini-slots 162V to examine, i.e., the internal counter is greater than the number of video connections, the network router 100 checks the remaining mini-slots 162N, if any exist, for request messages and performs and required actions.

Once the hybrid reservation slot HRS has been monitored by the network router 100, the reservation slots 160B continue to be utilized by the network router 100 as normal reservation slots NRS that are appropriately monitored, as illustrated in FIGS. 6A and 6B. This continues until the network router 100 once again determines that it is time to use the next reservation slot 160B that comes available as a hybrid reservation slot HRS. This determination is again made as a function of the hybrid reservation slot HRS generation frequency. However, before the next available reservation slot 160B is used as a hybrid reservation slot HRS, the base station preferably performs a threshold time check for purposes of determining if any further updates of its internal counters or the hybrid reservation slot HRS generation frequency are needed. This threshold time is preferably set to be equal to approximately one second.

Figure 6D:
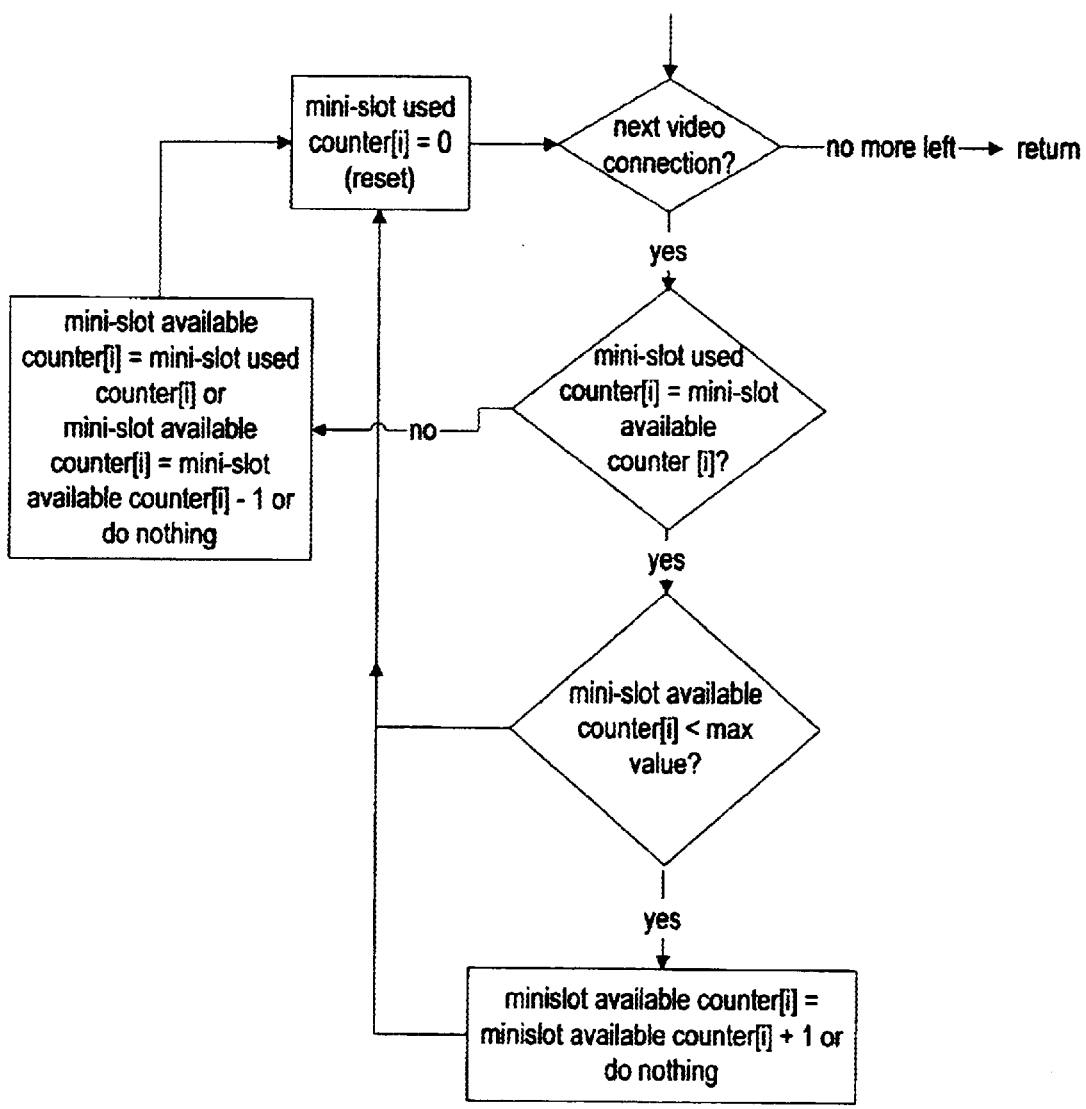
FIG. 6D is a flow chart diagram generally depicting a method for updating mini-slot allocations in accordance with the method illustrated in FIG. 6A.

If the threshold time has expired, the network router 100 evaluates its internal counters as illustrated in FIG. 6D for the purpose of updating the hybrid reservation slot HRS frequency or the mini-slot 162V allocation frequency. This updating is performed in order to match mini-slot allocations to the video compression cycle rate of the communication sources 20VI. Specifically, for each video connection, the network router 100 checks the mini-slot 162V usage counter against the mini-slot 162V allocation counter. If all of the allocated mini-slots 162V were used, the mini-slot 162V allocation counter is incremented by one provided that the mini-slot 162V allocation counter does not exceed the maximum value set for the hybrid reservation slot HRS frequency. If not all of the allocated mini-slots 162 were used, the mini-slot 162V allocation counter may optionally be decremented by one (provided that the mini-slot 162V allocation counter does not go below a minimum value, typically set to one), be set equal to the mini-slot usage counter, or not altered at all. Thereafter, the mini-slot 162V usage counter is reinitialized to zero.

Figure 6E:
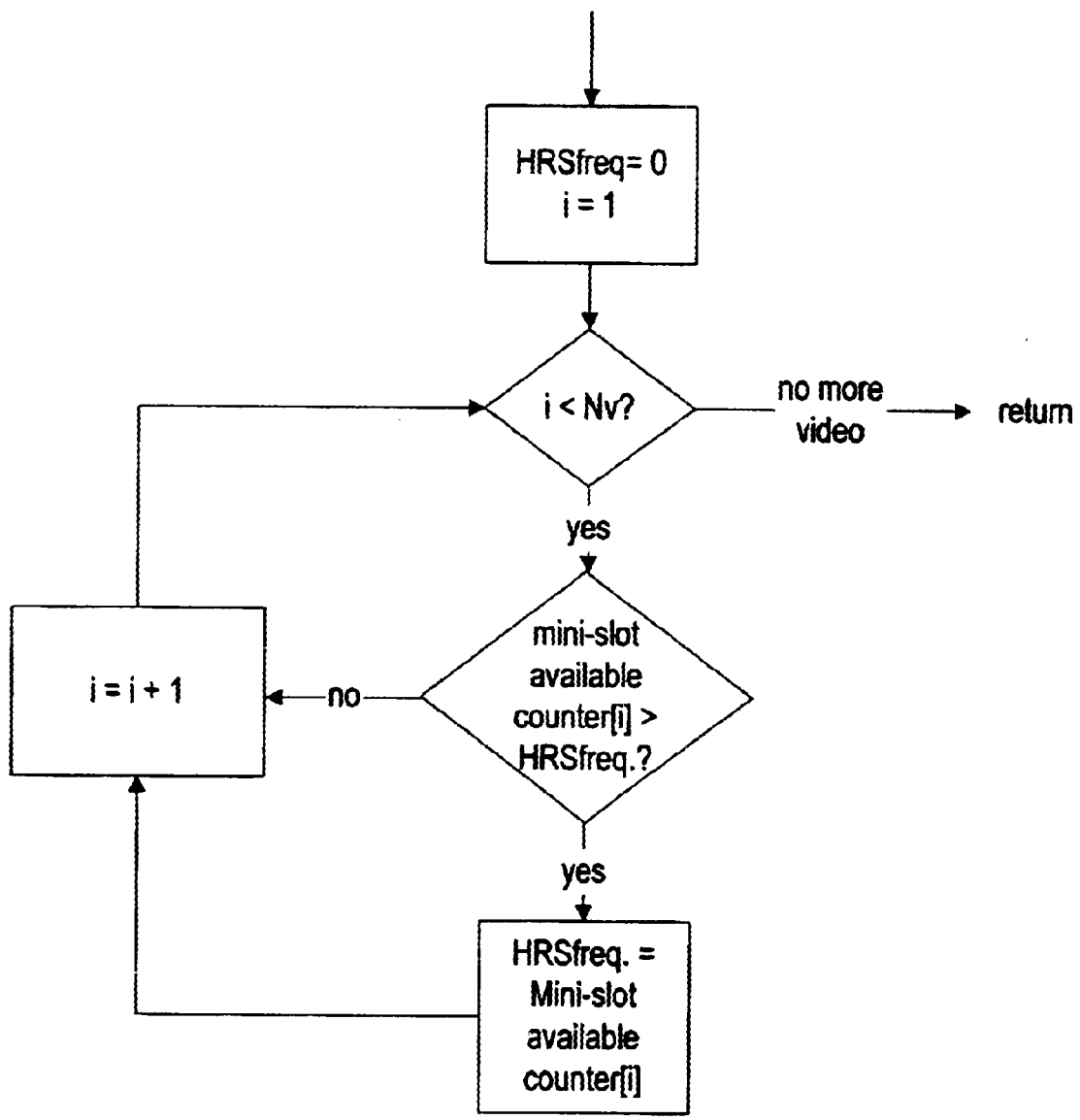
FIG. 6E is a flow chart diagram generally depicting a method for updating the ARMAP HRS slot generation frequency in accordance with the method illustrated in FIG. 6A.

Once the mini-slot 162 allocation counter for each of the on-going video connections has been updated, the network router 100 updates the hybrid reservation slot HRS frequency as illustrated in FIGS. 6A and 6E. Specifically, for each on-going video connection, the network router 100 compares the mini-slot 162V allocation counter against the current hybrid reservation slot HRS frequency and, if the value is greater, the hybrid reservation slot HRS frequency is set equal to the mini-slot 162V allocation counter value. If no on-going video connections exist, the hybrid reservation slot HRS frequency is once again set to zero. Any changes that may result from this threshold updating will be issued to the communication sources 20VI by the network router 100 on the down link channel.

It will be appreciated that after these adjustments have been made an on-going video connection may no longer be allocated a mini-slot 162V within each hybrid reservation slot HRS. This occurs when a communication source 20VI has a video compression cycle rates that is lower than the hybrid reservation slot HRS frequency. This tuning of the hybrid reservation slot HRS frequency and mini-slot 162V allocation does, however, result in optimal allocation of the reservation slots 160B and the best usage of radio resources for all communication sources 20.

In a further embodiment of the invention, the above-described algorithm may be modified to check for allocation oscillations that tend to result in bandwidth wastage. Allocation oscillations can be detected by tracking the pattern of the adjustments performed on the mini-slot 162V allocation counters for each video connection. For example, a pattern of alternating zeros and ones may signify that oscillation is occurring. In such a case, it is assumed that the communication source 20VI has reached an equilibrium capture and compression cycle rate and, as such, the mini-slot allocation algorithm can be modified to prevent any mini-slot 162V allocation counter adjustments for a predetermined period of time.

It is further contemplated that communication sources 20VI that are capable of transmitting video at rates faster than what the channel can handle can conserve power by monitoring the number of mini-slots 162V that they have been allocated and adjusting their video compression cycle rate accordingly. By way of example, a communication source 20VI may be capable of transmitting at a rate of 20 video frames per second while only being allocated 10 mini-slots per second due to heavy traffic. In such a case, by monitoring the number of reservations it was able to make, this communication source 20VI can adapt to the available radio resources by reducing its capture and compression rate to 10 frames per second. In this manner, power wastage is avoided and the spatial quality of the video image may be preserved.

As described previously, at the end of each video compression cycle the video packets generated by the communication sources 20VI are placed in a queue for subsequent transmission over the communication network. A portion of these packets will be dispatched within slots 160A that have been statically assigned to the communication sources 20VI during connection establishment time. The remaining packets are dispatched in slots that are dynamically assigned to the communication sources 20VI as a result of reservation requests. When making dynamic reservation requests, the communication sources 20VI specify within the request issued during the mini-slot 162V they have been allocated the exact number of packets they have in their transmission queue that are desired to be transmitted. If the network router 100 is able to accommodate the reservation request, or part of the request, it acknowledges the request and provides the communication source 20VI with the number and location of slots within which the packets may be transmitted.

The time duration of the mini-slots 162 is of sufficient length to accept the reservation request. Nevertheless, the number of bits that can be transmitted within the mini-slot 162 will have an impact upon the maximum number of slots that can be requested in a reservation request message. This impact can be minimized using an approach centered on the use of a quantization table. In particular, since the coding scheme and the type of video being transmitted will generally be known to the communication sources 20VI, the communication sources 20VI can approximate the number of packets that will be generated as a result of their compression cycle. Additionally, the communication sources 20VI will know the fixed number of bits that are available for use in requesting bandwidth. Using this information, the communication sources 20VI can establish a quantization table in which various bit patterns are optimally mapped to reservation requests for different numbers of slots, preferably utilizing a Lloyd-Max quantizer. When a connection is established, each communication source 20VI will communicate their computed quantization table to the network router 100, which the network router 100 maintains as state information for the duration of the connection. In this manner, during a reservation request, the communication source 20VI transmits the quantization level to the network router 100 as a chosen bit pattern which the base station indexes against the quantization table to determine how many slots the communication source 20VI is requesting to be reserved. Thus, the limitation on the number of slots that can requested by the communication source in a single reservation request using a fixed number of bits can be overcome.

In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. In a communication network comprising a communication source in communication with a network router over communication channel comprising a frame divided into a plurality of slots, a method for adjusting the rate at which video communications are issued by the communication source comprising the steps of:

monitoring at the communication source the communication channel to determine the number of slots within the frame that are being made available to the communication source for use in transmitting video information;

comparing at the communication source the number of slots within the frame that are being made available to the communication source for use in transmitting video information against the video capture and compression rate of the communication source; and adjusting at the communication source the video capture and compression rate as a function of the comparison in order to minimize the difference in the comparison thereby resulting in a more efficient usage of power within the communication source and a more efficient utilization of bandwidth within the communication channel.

2. In a communication network comprising a communication source in communication with a network router over communication channel comprising a frame divided into a plurality of slots, a computer-readable medium for use in connection with the communication source having computer-executable instructions for performing the steps of:

monitoring the communication channel to determine the number of slots within the frame that are being made available to the communication source for use in transmitting video information;

comparing the number of slots within the frame that are being made available to the communication source for use in transmitting video information against the video capture and compression rate of the communication source; and adjusting the video capture and compression rate as a function of the comparison in order to minimize the difference in the comparison thereby resulting in a more efficient usage of power within the communication source and a more efficient utilization of bandwidth within the communication channel.

3. In a communication network comprising a communication source in communication with a network router over communication channel comprising a frame divided into a plurality of slots, a system for adjusting the rate at which video communications are issued by the communication source comprising:

means for monitoring the communication channel to determine the number of slots within the frame that are being made available to the communication source for use in transmitting video information;

means for comparing the number of slots within the frame that are being made available to the communication source for use in transmitting video information against a video capture and compression rate of the communication source; and means for adjusting the video capture and compression rate as a function of the comparison in order to minimize the difference in the comparison thereby allowing a more efficient usage of power within the communication source and a more efficient utilization of bandwidth within the communication channel.

4. A method for processing video information by a video transmission device capable of acquiring and compressing the video information, the video transmission device supporting an actual acquisition rate value and an actual compression rate value with respect to video data processed by the video transmission device, the video transmission device being capable of transmitting the video data over a communication channel having a plurality of time ranges for transmission of compressed video information by the video transmission device, the method comprising the steps of:

determining a rate at which the plurality of ranges are made available to the video transmission device to define an available data rate;

determining a potential video acquisition rate value and a potential video compression rate value based on the available data rate;

comparing the potential video acquisition rate value and the potential video compression rate value to the actual acquisition rate value and actual compression rate value; and adjusting the actual acquisition rate value and actual compression rate value based on the comparison in order to minimize the difference in value between the potential video acquisition and compression rate values and the actual video transmission and compression rate values.

* * * * *

UNITED STATES PATENT AND TRADEMARK OFFICE
CERTIFICATE OF CORRECTION

PATENT NO.     : 6,618,363 B1
DATED          : September 9, 2003
INVENTOR(S)    : Bahl It is certified that error appears in the above-identified patent and that said Letters Patent is hereby corrected as shown below:

<u>Title page,</u>
Item, [56], References Cited, please add the following references:
```
-- 6,240,076   5/2001    Kanerva et al.
   5,745,642   4/1998    Ahn
   6,240,079   5/2001    Hamalainen et al.
   6,020,931   2/2000    Bilbrey et al.
   5,990,933   11/1999   Ozone et al.
   5,544,315   8/1996    Lehfeldt et al. --
```

<u>Column 10,</u>
Line 31, "Additionally the" should read -- Additionally, the --.

Signed and Sealed this

Twenty-seventh Day of April, 2004

JON W. DUDAS
*Acting Director of the United States Patent and Trademark Office*